(12) United States Patent
Bruno et al.

(10) Patent No.: US 8,347,874 B2
(45) Date of Patent: Jan. 8, 2013

(54) GREASE DRIP PAN AND GAS TANK BLOCKER FOR A BARBECUE GRILL

(75) Inventors: Adrian A. Bruno, Rolling Meadows, IL (US); Daniel S. Choi, Vernon Hills, IL (US); Leonard Zelek, Chicago, IL (US)

(73) Assignee: Weber-Stephen Products Co., Palatine, IL (US)

( * ) Notice: Subject to any disclaimer, the term of this patent is extended or adjusted under 35 U.S.C. 154(b) by 38 days.

(21) Appl. No.: 11/690,883

(22) Filed: Mar. 26, 2007

(65) Prior Publication Data

US 2007/0221202 A1 Sep. 27, 2007

Related U.S. Application Data

(60) Provisional application No. 60/786,780, filed on Mar. 27, 2006.

(51) Int. Cl.
| | |
|---|---|
| A47J 37/00 | (2006.01) |
| A47J 37/06 | (2006.01) |
| F24C 5/00 | (2006.01) |
| F24C 3/00 | (2006.01) |
| F24C 15/14 | (2006.01) |

(52) U.S. Cl. ..... 126/41 R; 126/25 R; 126/50; 126/39 R; 126/51; 99/400

(58) Field of Classification Search ............... 126/41 R, 126/14, 25 R, 39 R, 50, 51; 99/400, 425, 99/444–446

See application file for complete search history.

(56) References Cited

U.S. PATENT DOCUMENTS

| | | | | |
|---|---|---|---|---|
| 3,688,758 A * | 9/1972 | Stephen et al. | ............. | 126/41 R |
| 3,915,146 A * | 10/1975 | Bauer | ............. | 126/41 R |
| 4,321,857 A * | 3/1982 | Best | ............. | 99/340 |
| 4,665,891 A * | 5/1987 | Nemec et al. | ............. | 126/25 R |
| 4,677,964 A * | 7/1987 | Lohmeyer et al. | ............. | 126/41 R |
| 4,773,319 A * | 9/1988 | Holland | ............. | 99/446 |
| 4,827,903 A * | 5/1989 | Kim | ............. | 126/299 R |
| 5,050,577 A * | 9/1991 | Baynes et al. | ............. | 126/9 R |
| 5,086,753 A * | 2/1992 | Berger | ............. | 126/41 R |
| 5,279,277 A * | 1/1994 | Barker | ............. | 126/41 R |
| 5,323,758 A * | 6/1994 | Minshall et al. | ............. | 126/25 R |
| 5,408,985 A * | 4/1995 | Giebel et al. | ............. | 126/41 R |
| 5,617,840 A * | 4/1997 | Clifford | ............. | 126/41 R |
| D406,488 S * | 3/1999 | Bates et al. | ............. | D7/334 |
| 5,890,422 A * | 4/1999 | Clark et al. | ............. | 99/447 |
| 5,934,184 A * | 8/1999 | Schlosser et al. | ............. | 99/385 |
| 6,293,272 B1 * | 9/2001 | Harneit | ............. | 126/37 B |
| 6,619,600 B1 * | 9/2003 | Johnson et al. | ............. | 248/129 |
| 6,694,967 B2 * | 2/2004 | Stephen et al. | ............. | 126/41 R |

(Continued)

Primary Examiner — Steven B McAllister
Assistant Examiner — Frances H Kamps
(74) Attorney, Agent, or Firm — Baker & McKenzie LLP

(57) ABSTRACT

The inventions disclosed herein relate to frame assemblies for gas barbecue grills which incorporate structures for preventing a consumer from storing replacement fuel tanks on the grill, in order to minimize fire and tipping hazards. Because it is known that many consumers never install or even remove prior art tank blockers, the tank blocker of the present invention is adapted to serve as a function of the grill (in addition to the function of blocking a tank) or to support a component of the grill. The preferred embodiment of the tank blocker described herein is adapted to support a component of the grease management system, namely the grease drip pan. Consequently, it is believed that consumers will be forced to install or will be prevented from removing the tank blocker, lest the grease management system become inoperable (or function improperly), causing grease to spill onto the cart.

20 Claims, 4 Drawing Sheets

U.S. PATENT DOCUMENTS

| | | | |
|---|---|---|---|
| 6,925,998 B2* | 8/2005 | Bruno et al. | 126/14 R |
| 2003/0230299 A1* | 12/2003 | Bruno et al. | 126/25 R |
| 2005/0098168 A1* | 5/2005 | Williams et al. | 126/25 R |
| 2005/0229917 A1* | 10/2005 | Profitt et al. | 126/25 R |
| 2007/0163568 A1* | 7/2007 | Murray et al. | 126/50 |

* cited by examiner

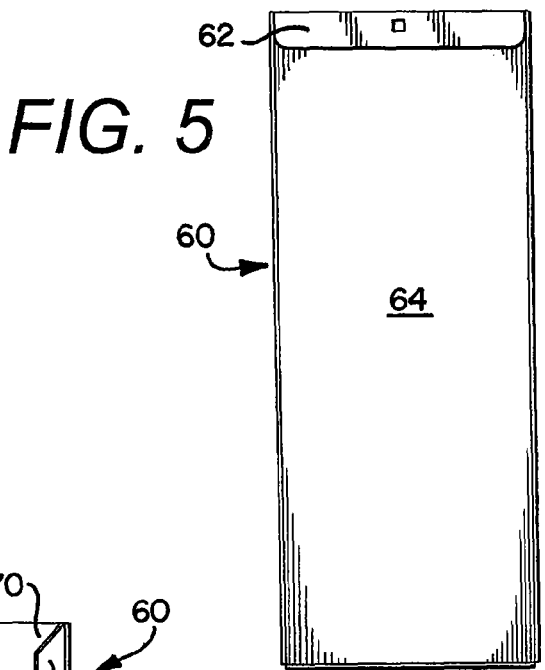
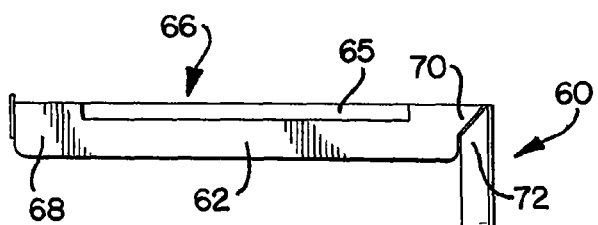
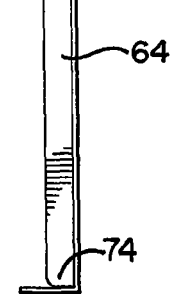
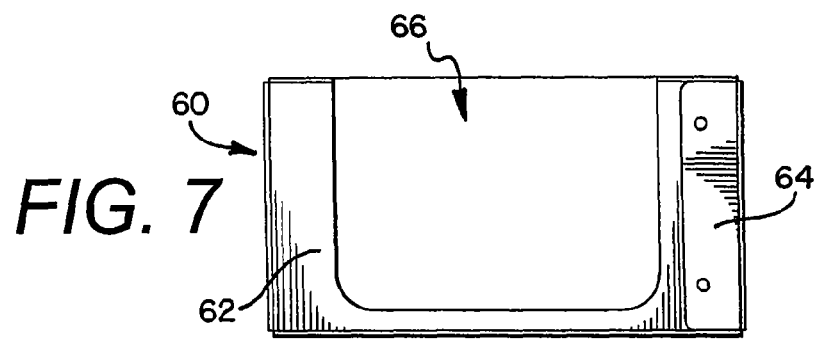

GREASE DRIP PAN AND GAS TANK BLOCKER FOR A BARBECUE GRILL

This application is based on and claims priority to U.S. Provisional Patent Application Ser. No. 60/786,780 which was filed on Mar. 27, 2006.

FIELD OF THE INVENTIONS

The inventions described and claimed herein relate generally to gas-fired barbecue grills which incorporate tank blocking structures to prevent a consumer from storing additional fuel tanks on the barbecue grill. In particular, the preferred embodiment of the inventions is a support structure for a grease drip pan which doubles as a tank blocker.

BACKGROUND OF THE INVENTIONS

Most gas-fired barbecue grills are comprised of a cooking chamber and a cart or frame assembly. The cooking chamber most often has a hinged lid and is mounted on top of or supported by the cart or frame assembly. Typical carts are constructed of a plurality of frame members such as molded plastic parts and/or metal structural tube members which are bolted, snapped, and/or welded together. The carts are quite often enclosed by panels and have doors at the front side for accessing the interior of the cart. Many gas-fired barbecue grills have a plurality of shelves; typically, there is one shelf in the lower portion of the grill and at least one side shelf. Some gas grills incorporate auxiliary burners on the side shelves to provide an additional cooking location.

There are essentially two options for providing fuel to a gas grill. Assuming natural gas is available, the grill can be hard-piped to connect into the natural gas lines. Such an installation is sometimes preferable if portability is not a concern. However, many users either do not have natural gas or prefer flexibility in use of a grill. For instance, some users do not have space for a permanently installed grill. For those users, it would be preferable to have a self-contained unit that can be moved from one location, where the grill is stored, to another location, where the grill is actually used to cook food. Thus, gas grills are commonly designed for use with refillable tanks (also referred to as cylinders). The refillable tanks are generally placed in the lower portion of the cart on a shelf. The refillable tanks provide a fuel source, such as liquefied propane gas ("LPG"), such that the grill is self-contained and can be used at a location away from a hard-piped source of gas.

Most consumers own more than one fuel tank, so that a full replacement tank is available when the first tank runs out of gas. Having a replacement tank available allows for uninterrupted cooking. It is known that many consumers store their replacement tanks alongside the first tank, on the grill assembly. Often times, the consumer will store the replacement tank in the cart, which could be enclosed. Unfortunately, there are inherent dangers related to such use and storage of fuel tanks. First and foremost, LPG is highly flammable. Considering the flammability of gas tanks, it is important to minimize the amount of fuel which is stored on the grill to reduce the chance for fire and/or explosions, especially for grills which have enclosed carts. Consequently, consumers who store replacement tanks on the grill are subject to increased risk of fire and explosion. Secondarily, gas tanks can be heavy and unwieldy when full. Most prudent grill manufacturers design the grills such that the tanks are optimally placed to prevent a high center of gravity. However, it is likely that the grill manufacturers never contemplated the grill cart to be used for storage of a replacement fuel tank. Consequently, prior art grills which hold replacement tanks may present a tipping hazard. For these reasons, it is important to configure the grill cart such that only one fuel tank may be placed in the interior of the cart, thus reducing the source of flammability and reducing the weight of the grill.

SUMMARY OF THE INVENTIONS

A first embodiment of the invention solves the problems identified above by incorporating a tank blocking structure in the interior of the grill cart. This structure would be fastened inside the cart, such that it is not readily removable, and would compartmentalize the interior of the cart such that only one tank will fit in the cart. In other words, the replacement tank cannot fit in any of the compartments formed by the structure. In the event that the barbecue grill assembly is designed such that the usable fuel tank is mounted on the outside of the frame assembly, the structure would compartmentalize the interior of the cart such that no additional tank will fit in the cart.

Unfortunately, it is believed that some consumers will not install the tank blockers or will remove them when they find out that they will be unable to store a replacement tank on the cart. Consequently, there is a need in the art for a tank blocker for a barbecue grill which will reduce the chance that a consumer will remove the tank blocker and store a replacement tank on the barbecue grill.

Therefore, the preferred embodiment of the inventions is adapted to have a dual purpose, whereby the tank blocker serves another function, in addition to the function of blocking the placement of a replacement tank. As such, consumers will have to install the preferred tank blocker, lest the grill operate improperly or even be altogether inoperable.

In the preferred embodiment of the tank blocker, the tank blocker includes a support for a grease drip pan. The consumer is forced to install the tank blocker; if the consumer fails to install the grease drip pan, the grease drippings from the grill will not be contained and will instead drip onto the grill cart. As such, the tank blocker performs a function for the grease management system in addition to its function as a tank blocker. Without the tank blocker, the grease management system will be inoperable or will operate improperly.

Although the tank blocker of the present inventions is described with reference to the preferred embodiment, wherein the tank blocker performs a function for the grease management system by supporting a component of the grease management system—i.e. the drip pan, it is contemplated that the tank blocker could perform other functions of the grill or could support other features or components of the grill, other than those described herein. For example, the tank blocker could include a tank support. The tank support could even include a gauge for displaying the amount of gas remaining in the tank. Alternatively, the tank blocker could serve as a support member for the frame assembly, whereby the tank blocker connects two or more components of the grill. Even further, the tank blocker could be adapted to support either or both the grease tray and/or the cooking chamber, as well as any other component of the grill.

BRIEF DESCRIPTION OF THE DRAWINGS

These and other features, aspects, objects, and advantages of the inventions described and claimed herein will become better understood upon consideration of the following detailed description, appended claims, and accompanying drawings where:

FIG. 5 is a left side view of the preferred embodiment of the gas tank blocker;

FIG. 6 is a front view of the preferred embodiment of the gas tank blocker;

FIG. 7 is a bottom view of the preferred embodiment of the gas tank blocker;

Figure 1:
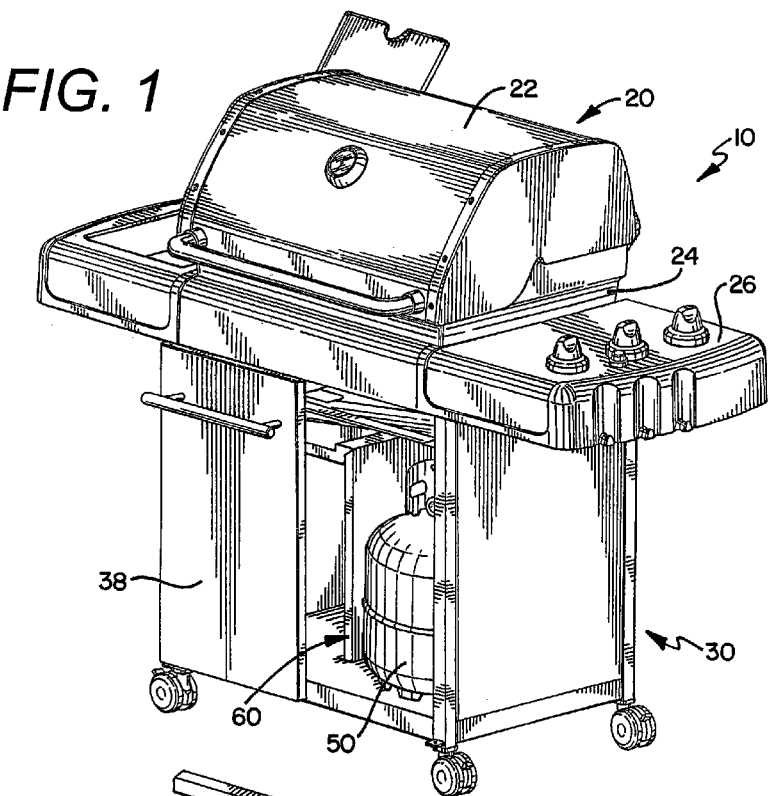
FIG. 1 is a perspective view of an exemplary barbecue grill (one of the doors is removed for clarity) with a preferred embodiment of the gas tank blocker disposed in the interior of the grill cart.

It should be understood that the drawings are not necessarily to scale and that the embodiments are sometimes illustrated by graphic symbols, phantom lines, diagrammatic representations and fragmentary views. In certain instances, details which are not necessary for an understanding of the inventions described and claimed herein or which render other details difficult to perceive may have been omitted. It should be understood, of course, that the inventions described herein are not necessarily limited to the particular embodiments illustrated herein.

Like reference numerals will be used to refer to like or similar parts from Figure to Figure in the following description of the drawings.

DETAILED DESCRIPTION OF THE DRAWINGS

Referring first to FIG. 1, an exemplary barbecue grill 10 is shown which incorporates a preferred embodiment of the gas (or fuel) tank blocking structure (or assembly, if multiple parts are used) 60 of the present inventions. As depicted, grills 10 typically include a cooking chamber (or surface) 20, a grill cart (or stand or frame assembly) 30, and side shelves (or working surface) 26. The cooking chamber 20 generally comprises an upper member 22 and a lower member 24, although it is contemplated that some grill designs may only incorporate the lower member 24. The upper member 22 is preferably hingedly attached to the lower member 24. The frame assembly 30 is generally for supporting the cooking chamber 20, side shelves 26, and associated components, such as a fuel tank 50 and a grease management system (as discussed in more detail below).

Figure 2:
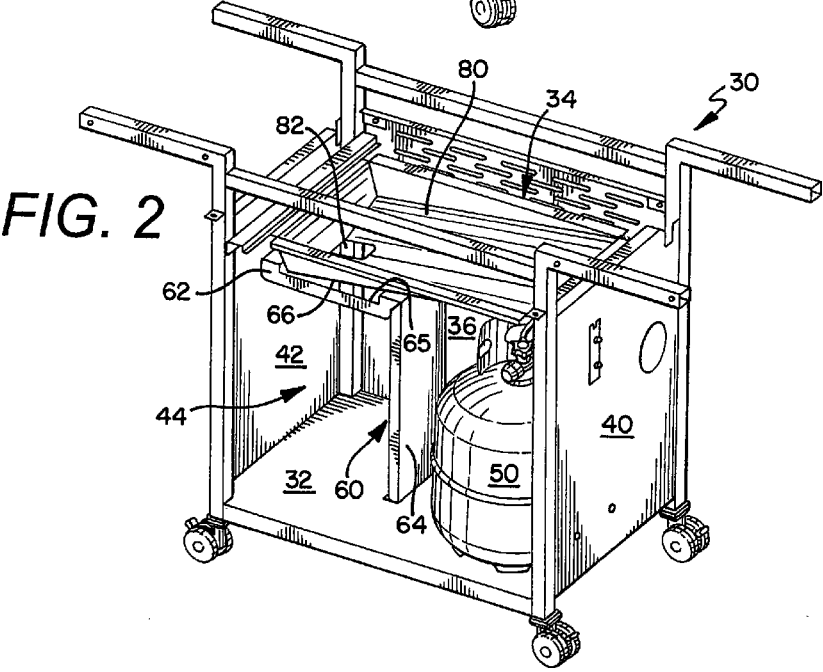
FIG. 2 is a perspective view of the exemplary barbecue grill cart (the cooking chamber and doors have been removed for clarity) with the preferred embodiment of the gas tank blocker disposed in the interior of the grill cart.
Figure 3:
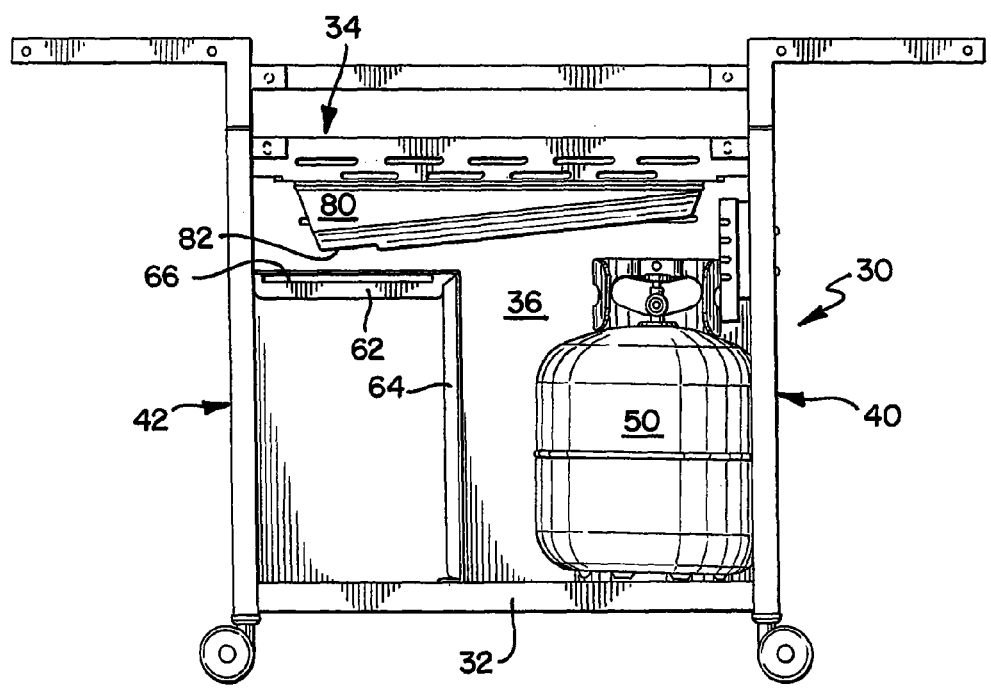
FIG. 3 is a front view of the exemplary barbecue grill cart (the cooking chamber and doors have been removed for clarity) with the preferred embodiment of the gas tank blocker disposed in the interior of the grill cart.

Typical frame assemblies 30 include a plurality of frame members, such as structural tubing and panels. As best shown in FIGS. 2-3, the exemplary frame assembly 30 includes both structural tubing, panels and doors. More specifically, the preferred frame assembly 30 has a front 38 covered by doors, a rear panel 36, a right side panel 40, a left side panel 42, a bottom panel 32, and a top 34, which are for the most part interconnected by structural tubing members. Note that the grease management system, including a grease drip tray 80, is disposed at or near the top 34 of the frame assembly 30. The frame assembly as depicted also includes casters and structural tubing, which extend outwardly to the left and right for attaching to the side shelves 26. The bottom panel 32, the top 34, the rear panel 36, the front 38, the right side panel 40, and the left side panel 42 define an interior space 44 for holding the grease management system and fuel tank 50 and for providing storage space for the consumer.

Figure 4:
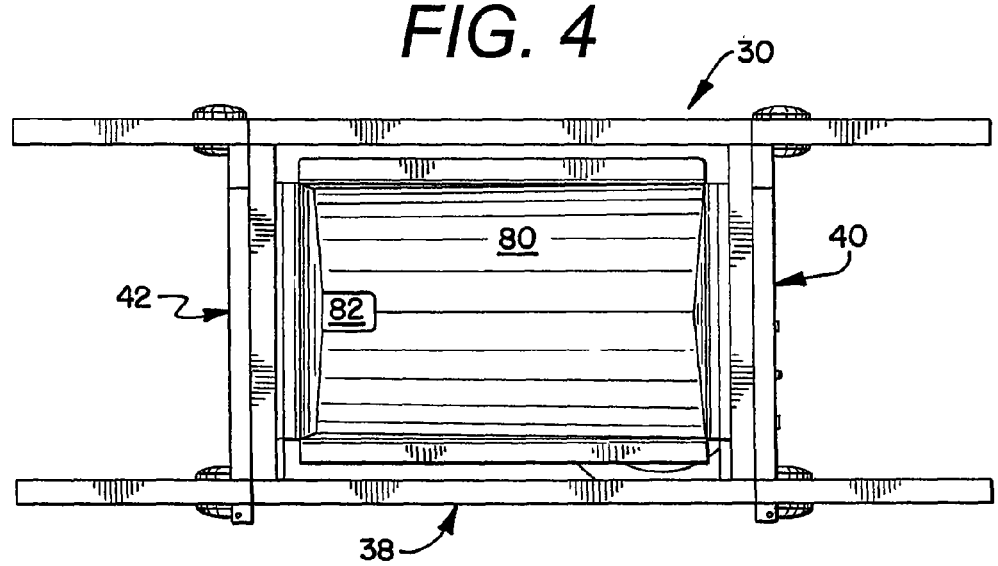
FIG. 4 is a top view of the exemplary barbecue grill cart (the cooking chamber and doors have been removed for clarity) with the preferred embodiment of the gas tank blocker disposed in the interior of the grill cart.
Figure 8:
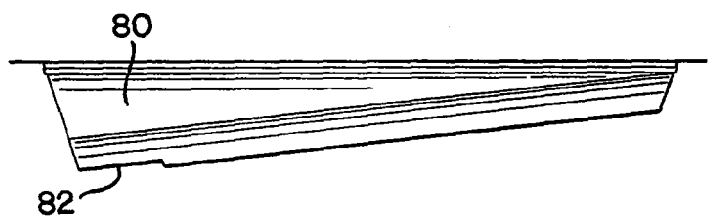
FIG. 8 is a front view of a preferred embodiment of a grease drip tray.
Figure 9:
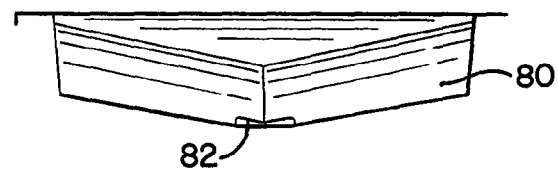
FIG. 9 is a right side view of the preferred embodiment of the grease drip tray.
Figure 10:
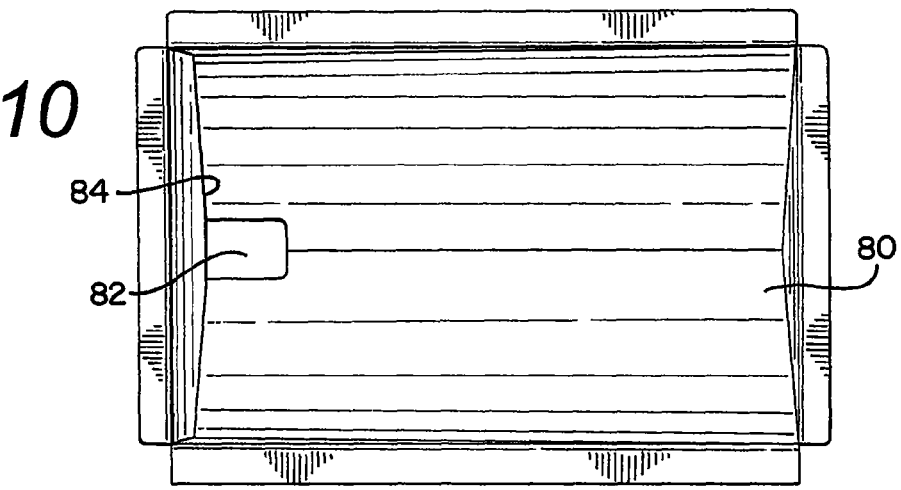
FIG. 10 is a bottom view of the preferred embodiment of the grease drip tray; and, FIG. 11 is a perspective view of a preferred embodiment of a grease drip pan.
Figure 11:
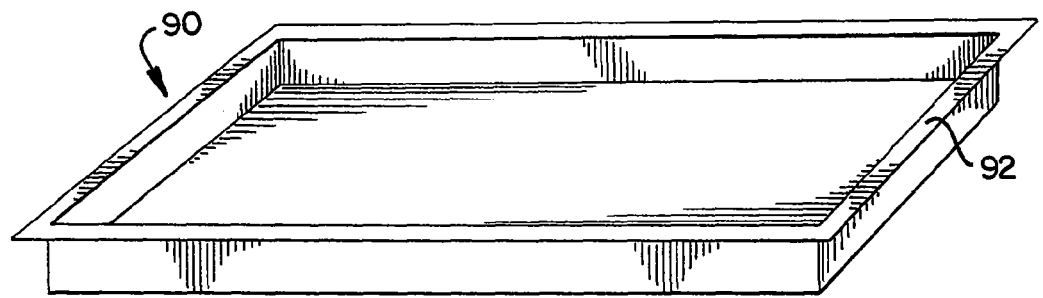

Typical grease management systems are designed to direct grease away from the cooking chamber 20 (where the high heat can cause grease fires) to an area of lower temperature which is typically below the cooking chamber 20. The exemplary grease management system, as best depicted in FIGS. 2-4, comprises a grease drip tray 80 and a grease drip pan 90, whereby the grease drip tray 80, which captures grease dripping from an opening (not shown) at the bottom of the cooking chamber 20, directs the grease to the grease drip pan 90 (which is shown in FIG. 11). The grease management system is preferably disposed at the top 34 of the frame assembly 30, whereby the grease drip tray 80 slidably engages with the frame assembly 30 such that the grease tray 80 is easily removed for cleaning. Note that it is contemplated that the grease drip tray 80 could be eliminated, whereby the lower member 24 of the cooking chamber 20 would be used to direct grease to the grease drip pan 90, although such configuration is not preferable because the lower member 24 can get extremely hot. As such, prolonged contact between the surfaces of the lower member 24 and the grease could cause a grease fire.

With reference to FIGS. 2-3 and 5-7, a preferred embodiment of the tank blocking structure 60 is shown. As demonstrated in the figures, the tank blocking structure 60 preferably compartmentalizes the interior 44 of the grill cart 30 such that only one fuel tank 50 can be placed at the interior 44 of the grill cart 30 at any one time. The tank blocking structure 60 preferably comprises a generally horizontal portion 62 and a generally vertical portion 64. The generally horizontal portion 62 has a first end 68 and a second end 70, wherein the first end 68 is fastened to one of the side panels (either the left panel 42, the right panel 40, or the rear panel 36) by any appropriate means, such as fasteners or weldments. The generally vertical portion 64 has a top end 72 and a bottom end 74, whereby the bottom end 74 is fastened to the bottom panel 32 by any appropriate means. The top end 72 of the generally vertical portion 64 is fixed to the second end 70 of the generally horizontal portion 62. Preferably, the tank blocking structure 60 is formed from sheet metal and is shaped like an inverted "L." However, it is contemplated that the structure 60 may be made or formed out of other materials, such as steel wire, plastic moldings, etc, and may have any other complementary shape, so long as the structure 60 prevents more than one tank 50 to be placed inside of the grill cart 30 at any one time. For example, an alternative embodiment of the tank blocking structure 60 could be formed as a cantilever-type structure which extends from a side panel. Alternatively, the tank blocking structure 60 could extend upwardly from the bottom panel 32.

Preferably, the generally horizontal portion 62 includes a recess (or holder or support) 66 for supporting a grease drip pan 90 (shown in FIG. 11 and discussed in more detail below). The generally horizontal portion 62 also preferably includes a cutout at a front edge of the recess 66 which allows easier placement and removal of the grease drip pan 90. By way of the cutout, the consumer need not tip the grease drip pan 90 any significant amount in order to remove it from the recess 66.

With reference to FIGS. 2-4 and 8-10, the preferred grease drip tray 80 includes an upper surface which is preferably generally concave and is sloped towards an opening 82. The upper surface of the grease drip tray 80 has a horizontal cross-sectional area which is approximately equal to that of the lower member 24 of the cooking chamber 20, such that the grease drip tray 80 captures all of the grease dripping from the cooking chamber 20. The opening 82 of preferred grease drip tray 80 is disposed generally above the grease drip pan 90 such that the grease drips through the opening 82 into the grease drip pan 90. Preferably, the grease drip pan 90 is disposed near a side panel of the grill; as such, the opening 82 is disposed near an edge 84 of the grease drip tray 80. Furthermore, the concave-shaped upper surface preferably has a generally triangular cross-section shape such that the grease travels down the center of the grease drip tray 80 towards the opening 82 at the edge 84 of the tray. The configuration of the grease drip tray 80, as depicted in the figures, was found to perform best with respect to resisting grease fires. Nevertheless, it is contemplated that the opening 82 (along with the grease drip pan 90) could be disposed elsewhere. Indeed, the opening 82 could be disposed at the center of the grease drip tray 80 or even at one of the corners. The location of the opening 82 is merely a design choice. To facilitate various locations of the opening 82, it is contemplated the tank blocking structure 60 would have to be modified. However, such changes to the tank blocking structure 60 to facilitate varying locations of the opening 82 requires only ordinary skill in the art.

Referring now to FIG. 11, the grease drip pan 90 is generally rectangularly shaped and has a depth sufficient to store an adequate amount of grease. The grease drip pan 90 includes a lip 92 which is adapted to overlap with the tank blocking structure 60 when the grease drip pan 90 is placed in the recess 66 in the generally horizontal portion 62 of the tank blocking structure 60, such that the grease drip pan 90 is adequately supported by the tank blocking structure 60. It is contemplated that the grease drip pan 90 will be formed of some type of metal, and may be permanent or disposable. A permanent grease drip pan 90 will have a thicker wall and consequently will be much more rigid and durable. However, disposable grease drip pans 90 allow for easier clean-up. It is contemplated that the benefits of both permanent and disposable grease drip pans 90 may be realized by the consumer if he/she uses both by placing a disposable pan in a permanent pan.

Although the inventions described and claimed herein have been described in considerable detail with reference to certain preferred embodiments, one skilled in the art will appreciate that the inventions described and claimed herein can be practiced by other than the preferred embodiments, which have been presented for purposes of illustration and not of limitation. Therefore, the spirit and scope of the appended claims should not be limited to the description of the preferred embodiments contained herein.

We claim:

1. A barbecue grill assembly comprising:
   a cooking chamber, a frame assembly, and a tank blocking structure;
   the frame assembly supporting the cooking chamber;
   the frame assembly having an interior with a volume capable of receiving two fuel tanks of equal size, except that the tank blocking structure divides the interior of the frame assembly to create a plurality of compartments, such that only one of the two fuel tanks can be disposed in the frame assembly; and,
   the tank blocking structure holding a grease drip pan for collecting grease from the cooking chamber of the barbecue grill assembly, wherein the tank blocking structure is spaced apart from and positioned below the cooking chamber and is not suspended from the cooking chamber.

2. The barbecue grill assembly of claim 1 wherein:
   the tank blocking structure is generally L-shaped, whereby the tank blocking structure has a generally horizontal portion and a generally vertical portion;
   the generally horizontal portion is affixed to a side of the frame assembly; and,
   the generally vertical portion is affixed to a bottom of the frame assembly.

3. The barbecue grill assembly of claim 1 wherein the tank blocking structure is functionally linked to the cooking chamber of the barbecue grill assembly.

4. The barbecue grill assembly of claim 1 wherein the tank blocking structure supports a component of the barbecue grill assembly that is functionally associated with the cooking chamber.

5. The barbecue grill assembly of claim 2 wherein the generally horizontal portion is affixed to the side of the frame assembly by at least one weld.

6. The barbecue grill assembly of claim 2 wherein the generally horizontal portion is affixed to the side of the frame assembly by at least one fastener.

7. The barbecue grill assembly of claim 2 wherein the tank blocking structure is functionally linked to the cooking chamber of the barbecue grill assembly.

8. The barbecue grill assembly of claim 7 wherein the blocking structure holds a grease drip pan for collecting grease from the cooking chamber.

9. A barbecue grill assembly comprising:
   a cooking chamber, a frame assembly, a tank blocking structure, and a fuel tank;
   the frame assembly having an interior and supporting the cooking chamber;
   the fuel tank being disposed in the interior of the frame assembly;
   the tank blocking structure being disposed in the interior of the frame assembly, whereby the tank blocking structure prevents a replacement fuel tank from being disposed in the interior of the frame assembly, the replacement fuel tank having a size equal to a size of the fuel tank, wherein
   the tank blocking structure is spaced apart from and positioned below the cooking chamber and is not suspended from the cooking chamber; and,
   wherein the frame assembly has a volume capable of housing both the fuel tank and replacement fuel tank except for the tank blocking structure.

10. The barbecue grill assembly of claim 9 wherein:
    the tank blocking structure is generally L-shaped, whereby the tank blocking structure has a generally horizontal portion and a generally vertical portion which compartmentalize the interior of the frame assembly;
    the generally horizontal portion is affixed to a side of the frame assembly; and,
    the generally vertical portion is affixed to a bottom of the frame assembly.

11. The barbecue grill assembly of claim 9 wherein the component is a grease drip pan and wherein the grease drip pan would not operate properly if the tank blocking structure is removed.

12. The barbecue grill assembly of claim 11 wherein the tank blocking structure holds the grease drip pan.

13. A barbecue grill assembly comprising:
a cooking chamber, a frame assembly, a tank blocking structure, and a fuel tank;
the frame assembly having an interior and supporting the cooking chamber;
the fuel tank being disposed in the interior of the frame assembly;
the tank blocking structure being disposed in and compartmentalizing the interior of the frame assembly to form a plurality of compartments, whereby a replacement tank will not fit in any of the plurality of compartments, the replacement tank having a size equal to a size of the fuel tank, wherein
the tank blocking structure, wherein the tank blocking structure is spaced apart from and positioned below the cooking chamber and is not suspended from the cooking chamber; and,
wherein the frame assembly has a volume capable of housing both the fuel tank and replacement fuel tank except for the tank blocking structure.

14. A barbecue grill assembly comprising:
a cooking chamber, a frame assembly, a grease drip tray, a grease drip pan, a tank blocking structure, and a first fuel tank;
the frame assembly having an interior defined by a top, a bottom panel, a rear panel, a right side panel, a left side panel, and a front;
the frame assembly having at least one door at the front of the frame assembly;
the cooking chamber being supported by the frame assembly at the top of the frame assembly;
the grease drip tray being disposed below the cooking chamber and having an opening for directing grease into the grease drip pan;
the first fuel tank being disposed in the interior of the frame assembly;
the tank blocking structure being mounted in the interior of the frame assembly and being adapted to support the grease drip pan below the opening of the grease drip tray and to prevent a second fuel tank, of a size equal to that of the first fuel tank, from being disposed at the interior of the frame assembly, and
wherein the frame assembly has a volume capable of housing both the fuel tank and replacement fuel tank except for the tank blocking structure.

15. The barbecue grill assembly of claim 14 wherein the tank blocking structure compartmentalizes the interior of the frame assembly.

16. The barbecue grill assembly of claim 14 wherein the tank blocking structure divides the interior of the frame assembly into a plurality of compartments, whereby a replacement tank will not fit in any of the plurality of compartments.

17. The barbecue grill assembly of claim 14 wherein:
the tank blocking structure consists essentially of a first portion extending transverse to a second portion;
the first portion having a first end and a second end, the first end being affixed to a side panel; and,
the second portion having an upper end and a lower end, the lower end being affixed to the bottom panel and the upper end being affixed to the second end of the generally horizontal portion.

18. The barbecue grill assembly of claim 17 wherein the first portion has a recess for holding the grease drip pan.

19. The barbecue grill assembly of claim 17 wherein the first portion has a support for holding the grease drip pan.

20. The barbecue grill assembly of claim 17 wherein the side panel is the right side panel, the left side panel, or the rear panel.

* * * * *

UNITED STATES PATENT AND TRADEMARK OFFICE
CERTIFICATE OF CORRECTION

| | | |
|---|---|---|
| PATENT NO. | : 8,347,874 B2 | Page 1 of 1 |
| APPLICATION NO. | : 11/690883 | |
| DATED | : January 8, 2013 | |
| INVENTOR(S) | : Bruno et al. | |

It is certified that error appears in the above-identified patent and that said Letters Patent is hereby corrected as shown below:

On the title page item [60], under the heading Related U.S. Application Data, should read:
-- Provisional Application No. 60/786,760, filed on Mar. 27, 2006. --

In the Specification

Column 1, lines 4-6 should read:
-- This application is based on and claims priority to U.S. Provisional Patent Application Ser. No. 60/786,760 which was filed on Mar. 27, 2006. --

Signed and Sealed this
Fourteenth Day of October, 2014

Michelle K. Lee
*Deputy Director of the United States Patent and Trademark Office*